DeW. CLOUGH.
Churn.
No. 61,716. Patented Feb. 5, 1867.
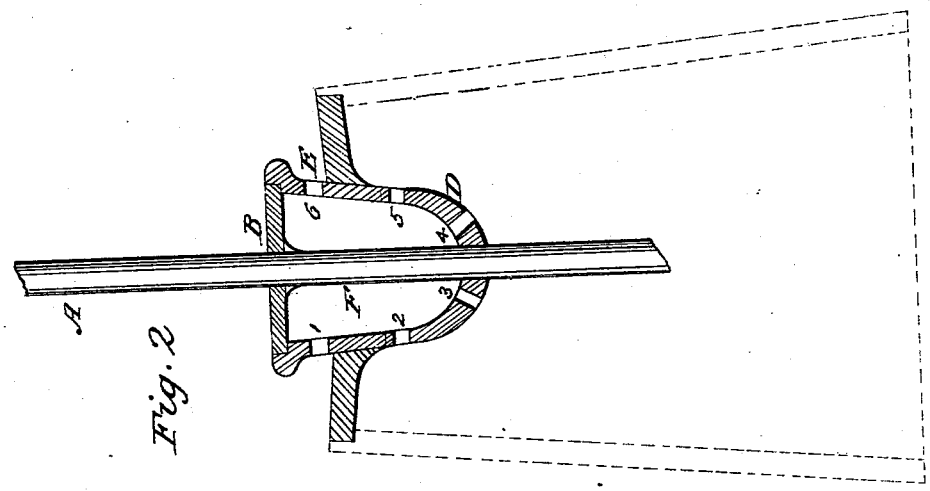
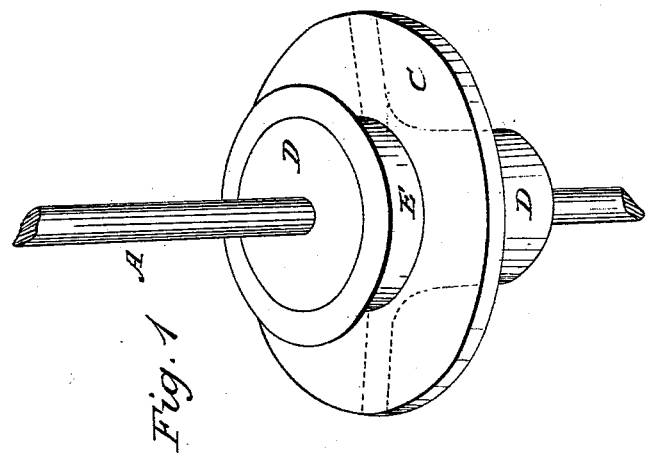
Witnesses:
Charles W. Miles
A. Babbett.
Inventor:
Dewitt Clough.

United States Patent Office.

DE WITT CLOUGH, OF AUBURN, NEW YORK.

Letters Patent No. 61,716; dated February 5, 1867.

IMPROVEMENT IN CHURNS.

*The Schedule referred to in these Letters Patent and making part of the same.*

TO ALL WHOM IT MAY CONCERN:

Be it known that I, DE WITT CLOUGH, of the city of Auburn, in Cayuga county, New York, have invented a new and improved Mode of Constructing the Common Dash Churn; and I do hereby declare the following to be a full, clear, and exact description of the same, reference being had to the accompanying drawings, making a part of this specification, and to the letters of reference marked thereon.

The object of this invention is to prevent the cream from working up through the top of the churn in the process of churning, and at the same time to supply all the air requisite to make the butter; and in order that others skilled in the art may know how to make and use my invention, I will proceed to describe its construction and mode of operation.

Figure 1 is a perspective view of the device used for the above purpose, in which A represents the position of the dash-rod; B the top of the air-chamber; C the top of the churn, and D and E the air-chamber portions of the form which is represented in dotted lines, they being behind the top of the churn C.

Figure 2 is a vertical cross-section taken through the centre of fig. 1.

The dotted lines showing the place occupied by the churn; A dash-rod; B top of air-chamber; D and E air-chamber, and F the inside thereof; 1 2 3 4 5 6 are openings into said chamber. 1 and 6 are above the top of the churn C, 2 3 4 5 are below and communicate with the inside of the churn. The holes 1 2 5 6 are air-holes; and the holes 3 and 4 are dripping-holes to allow the cream which is brought up from below into the air-chamber F to drip immediately back into the churn. As the dash-rod is thrust down, a body of atmospheric air, equal in content to the dash-rod, passes into the holes 2 and 5, into the air-chamber F, and from thence out of the holes 1 and 6, and when the dash-rod is lifted a reverse action takes place, and air in sufficient quantities is allowed to enter the churn for all practical purposes. The holes 1 2 5 and 6 being horizontal, and the air-tube vertical, if the holes are made of suitable size no particle of cream or milk can escape from the body of the churn. The nature of my invention consists in having a vertical air-chamber, with horizontal openings therein, to allow of a free ingress and egress of the air to compensate for the action of the dash-rod.

Having above described the construction and mode of operating my invention, what I claim as new, and wish to secure by Letters Patent, is—

The vertical air-chamber F, with the horizontal openings 1 2 5 6, as above set forth.

DE WITT CLOUGH.

Witnesses:
CHARLES W. MILES,
A. BABBETT.